US010765096B2

(12) United States Patent
Takechi et al.

(10) Patent No.: US 10,765,096 B2
(45) Date of Patent: Sep. 8, 2020

(54) DUAL-BEARING REEL

(71) Applicant: Shimano Inc., Sakai, Osaka (JP)

(72) Inventors: Kunio Takechi, Sakai (JP); Youhei Toake, Sakai (JP); Motohiro Niitsuma, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 276 days.

(21) Appl. No.: 15/801,541

(22) Filed: Nov. 2, 2017

(65) Prior Publication Data

US 2018/0332834 A1 Nov. 22, 2018

(30) Foreign Application Priority Data

May 18, 2017 (JP) .................................. 2017-099133

(51) Int. Cl.
*A01K 89/01* (2006.01)
*A01K 89/015* (2006.01)

(52) U.S. Cl.
CPC ........ *A01K 89/015* (2013.01); *A01K 89/0192* (2015.05)

(58) Field of Classification Search
CPC .............. A01K 89/015; A01K 89/0155; A01K 89/0192
See application file for complete search history.

(56) References Cited

U.S. PATENT DOCUMENTS

| 5,246,187 A * | 9/1993 | Noda | A01K 89/0189 242/261 |
| 5,816,518 A * | 10/1998 | Miyazaki | A01K 89/0192 242/310 |
| 5,829,701 A * | 11/1998 | Murayama | A01K 89/0192 242/310 |
| 7,341,215 B2 * | 3/2008 | Martin | A01K 89/0192 242/310 |
| 9,603,348 B2 * | 3/2017 | Hyun | A01K 89/0192 |
| 10,058,083 B2 * | 8/2018 | Nonogaki | H02K 5/10 |
| 10,080,356 B2 * | 9/2018 | Hyun | A01K 89/01555 |
| 10,091,979 B2 * | 10/2018 | Chew | A01K 89/015 |
| 2010/0006688 A1 * | 1/2010 | Ikuta | A01K 89/01931 242/297 |
| 2011/0011966 A1 * | 1/2011 | Takechi | A01K 89/0192 242/255 |

(Continued)

FOREIGN PATENT DOCUMENTS

JP 2012100624 A 5/2012

*Primary Examiner* — Emmanuel M Marcelo
(74) *Attorney, Agent, or Firm* — United IP Counselors, LLC (57) ABSTRACT

A dual-bearing reel includes a reel body, a cover member and a casting control mechanism. The cover member is disposed to cover the reel body from a first side plate side, and includes a cover part, a bulging part and a first boss part. The cover part is located outside a first side plate of a reel body of the dual-bearing reel in an axial direction. The bulging part bulges outward from the cover part in the axial direction. The first boss part has a shape protruding outward from the bulging part in the axial direction, and causes a spool shaft to be inserted therethrough. The casting control mechanism includes an operating member that is attached to the first boss part so as to be movable in the axial direction and protrudes at part of an outer periphery thereof from the bulging part as seen in the axial direction.

9 Claims, 5 Drawing Sheets

(56) References Cited

U.S. PATENT DOCUMENTS

| | | | |
|---|---|---|---|
| 2013/0087647 A1* | 4/2013 | Niitsuma | A01K 89/0192 |
| | | | 242/223 |
| 2013/0161433 A1* | 6/2013 | Takechi | A01K 89/059 |
| | | | 242/243 |
| 2013/0161435 A1* | 6/2013 | Takechi | A01K 89/058 |
| | | | 242/283 |
| 2014/0183293 A1* | 7/2014 | Nakagawa | A01K 89/015 |
| | | | 242/255 |
| 2016/0106083 A1* | 4/2016 | Niitsuma | A01K 89/01928 |
| | | | 242/310 |
| 2016/0165867 A1* | 6/2016 | Hyun | A01K 89/0192 |
| | | | 242/310 |
| 2016/0249595 A1* | 9/2016 | Haraguchi | A01K 89/0193 |
| | | | 242/283 |
| 2016/0302400 A1* | 10/2016 | Chew | A01K 89/015 |
| 2017/0013818 A1* | 1/2017 | Kobayashi | A01K 89/0193 |
| 2019/0014763 A1* | 1/2019 | Hyun | A01K 89/01123 |
| 2019/0183105 A1* | 6/2019 | Hyun | A01K 89/0192 |

\* cited by examiner

DUAL-BEARING REEL

CROSS-REFERENCE TO RELATED APPLICATIONS

This application claims priority to Japanese Patent Application No. 2017-099133 filed on May 18, 2017, the entirety of which is hereby incorporated by reference in its entirety.

BACKGROUND

Technical Field

The present disclosure relates to a dual-bearing reel.

Background Information

Dual-bearing reels are provided with a casting control mechanism for regulating a braking force acting on a spool. The casting control mechanism includes a knob member, which is screwed onto a boss part of a cover member, and a plurality of friction plates that press a spool shaft in the axial direction of the spool shaft. The knob member is movable in the axial direction of the spool shaft. When a turning operation is performed for the knob member, the knob member is moved in the axial direction. A pressing force, applied from the plurality of friction plates to press the spool shaft, varies in conjunction with axial movement of the knob member, whereby the braking force acting on the spool is regulated.

As seen in the axial direction, a knob member described in Japan Laid-open Patent Application Publication No. 2012-100624 is disposed within a bulging part that bulges axially outward from a second side cover. In other words, as seen in the axial direction, the outer periphery of the knob member does not protrude from the bulging part (see FIG. 2 of Japan Laid-open Patent Application Publication No. 2012-100624). In this configuration, the bulging part makes it difficult for an angler to contact the knob member with his/her finger. Thus, the angler has difficulty in performing the turning operation for the knob member, and cannot easily regulate the braking force acting on the spool.

BRIEF SUMMARY

It is an object of the present disclosure to enhance operability of a casting control mechanism in a dual-bearing reel.

A dual-bearing reel according to an aspect of the present disclosure includes a spool for rotating in conjunction with rotation of a spool shaft and a handle, and is capable of forwardly releasing a fishing line. The dual-bearing reel includes a reel body, a cover member and a casting control mechanism. The reel body includes a first side plate, a second side plate and a coupling part. The second side plate is provided at an interval from the first side plate in an axial direction of the spool shaft. The coupling part couples the first side plate and the second side plate. The cover member is disposed to cover the reel body from a first side plate side, and includes a cover part, a bulging part and a first boss part. The cover part is located outside the first side plate in the axial direction. The bulging part bulges outward from the cover part in the axial direction. The first boss part has a shape protruding outward from the bulging part in the axial direction, and causes the spool shaft to be inserted therethrough. The casting control mechanism includes an operating member that is attached to the first boss part so as to be movable in the axial direction and protrudes at part of an outer periphery thereof from the bulging part as seen in the axial direction. The casting control mechanism regulates a braking force for acting on the spool by movement of the operating member in the axial direction.

In the present dual-bearing reel, as seen in the axial direction, part of the outer periphery of the operating member protrudes from the bulging part of the cover member. This makes it easy to operate the operating member. Due to this, the braking force for acting on the spool can be easily regulated, whereby operability of the casting control mechanism is enhanced.

Preferably, the cover member includes a step part that extends outward from the cover part in the axial direction and connects the cover part and the bulging part. In this case, as seen in the axial direction, part of the outer periphery of the operating member is configured to protrude from the step part.

Preferably, the step part includes a slant part that slants at a region thereof located adjacently to the operating member so as to gradually approach an axis of the spool shaft in a direction toward the bulging part from the cover part. In this case, part of the outer periphery of the operating member can be easily protruded from the bulging part without increasing the outer diameter of the operating member.

Preferably, the slant part extends in a circular-arc shape as seen in the axial direction. In this case, the slant part functions as a restriction part that restricts the range of the turning operation for the operating member. Hence, too much tightening or loosening of the operating member can be prevented.

Preferably, the operating member is a turning member having a closed-end tubular shape, and is attached at an inner peripheral part thereof to an outer peripheral part of the first boss part so as to be turnable. The operating member includes a small diameter part and a large diameter part. The large diameter part, having a larger outer diameter than the small diameter part, is provided outside the small diameter part in the axial direction, and protrudes at part of an outer periphery thereof from the bulging part as seen in the axial direction. In this case, the bulging part and the large diameter part are prevented from being located closely to each other too much in the axial direction. This makes it easy to operate the operating member.

Preferably, the cover member further includes a second boss part that is provided in a position located forward of the first boss part so as to protrude outward from the bulging part in the axial direction. The dual-bearing reel further includes a drive shaft for penetrating the second boss part in the axial direction. In this case, for instance, even when the handle is disposed on the first cover side, which is on the same side as the operating member, the operating member can be easily operated without being hindered by the handle.

According to the present disclosure, operability of a casting control mechanism can be enhanced in a dual-bearing reel.

BRIEF DESCRIPTION OF THE DRAWINGS

Referring now to the attached drawings which form a part of this original disclosure.

DETAILED DESCRIPTION OF EMBODIMENTS

Figure 1:
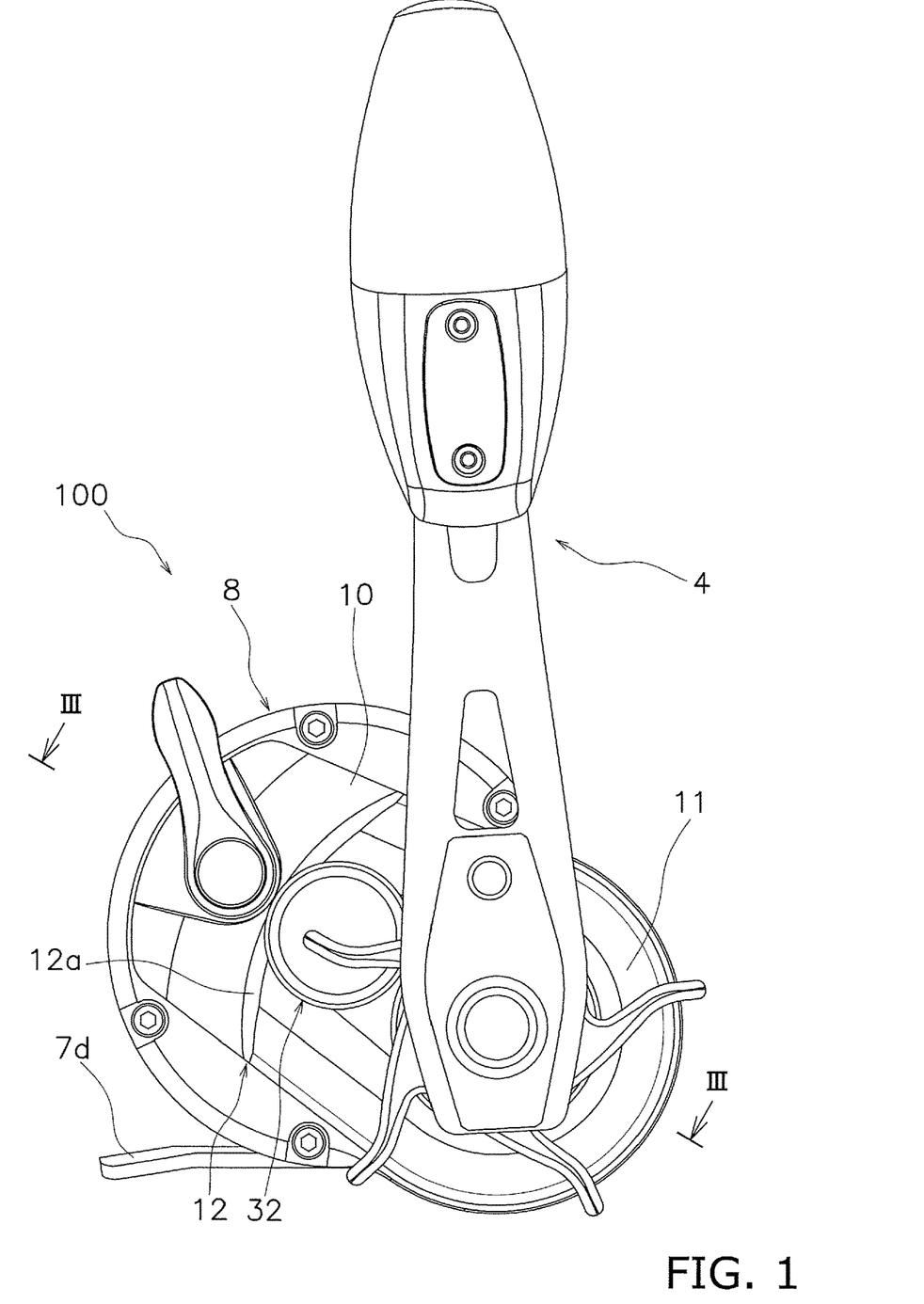
FIG. 1 is a side view of a dual-bearing reel employing a preferred embodiment of the present disclosure.
Figure 2:
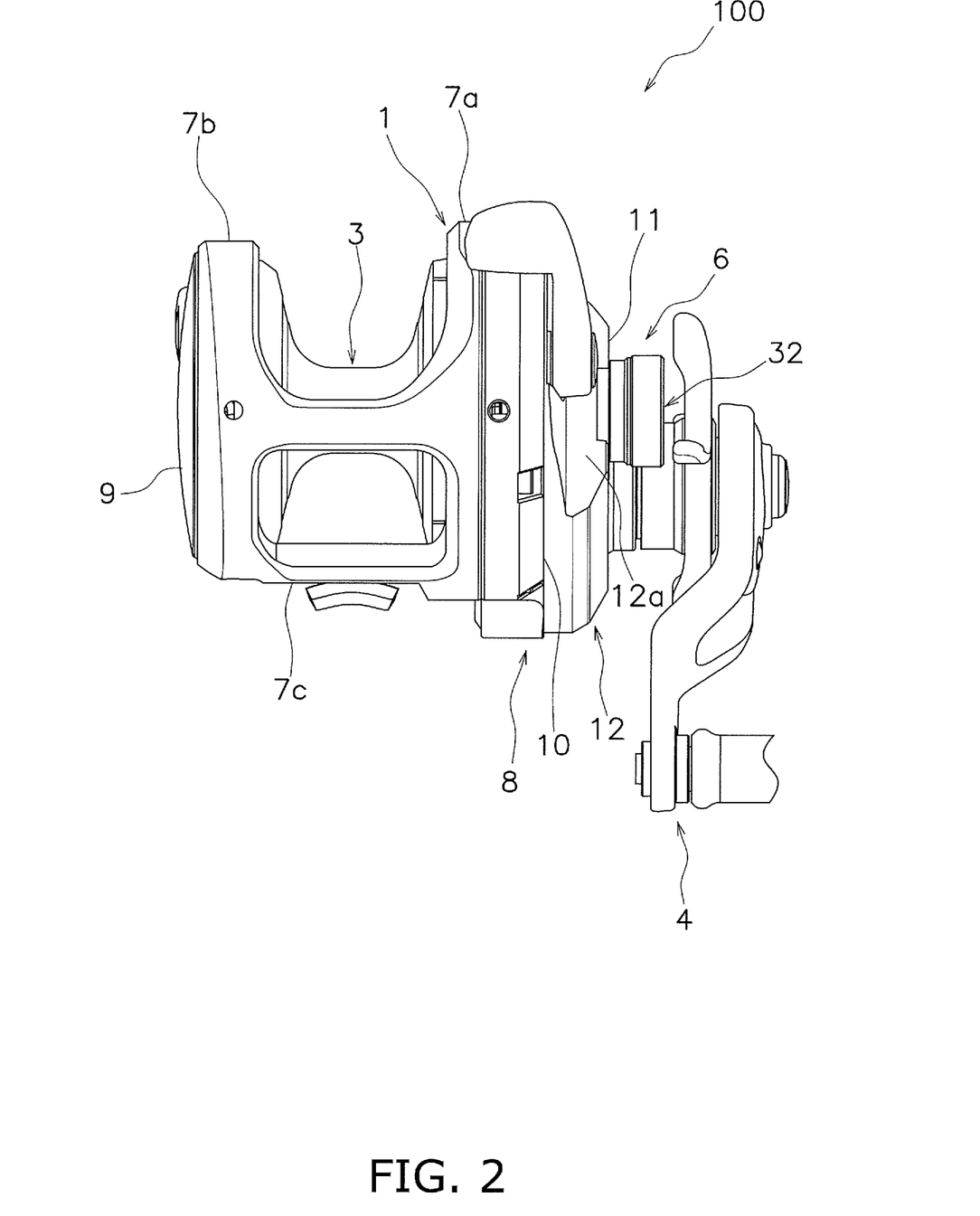
FIG. 2 is a rear view of the dual-bearing reel employing the preferred embodiment of the present disclosure.
Figure 3:
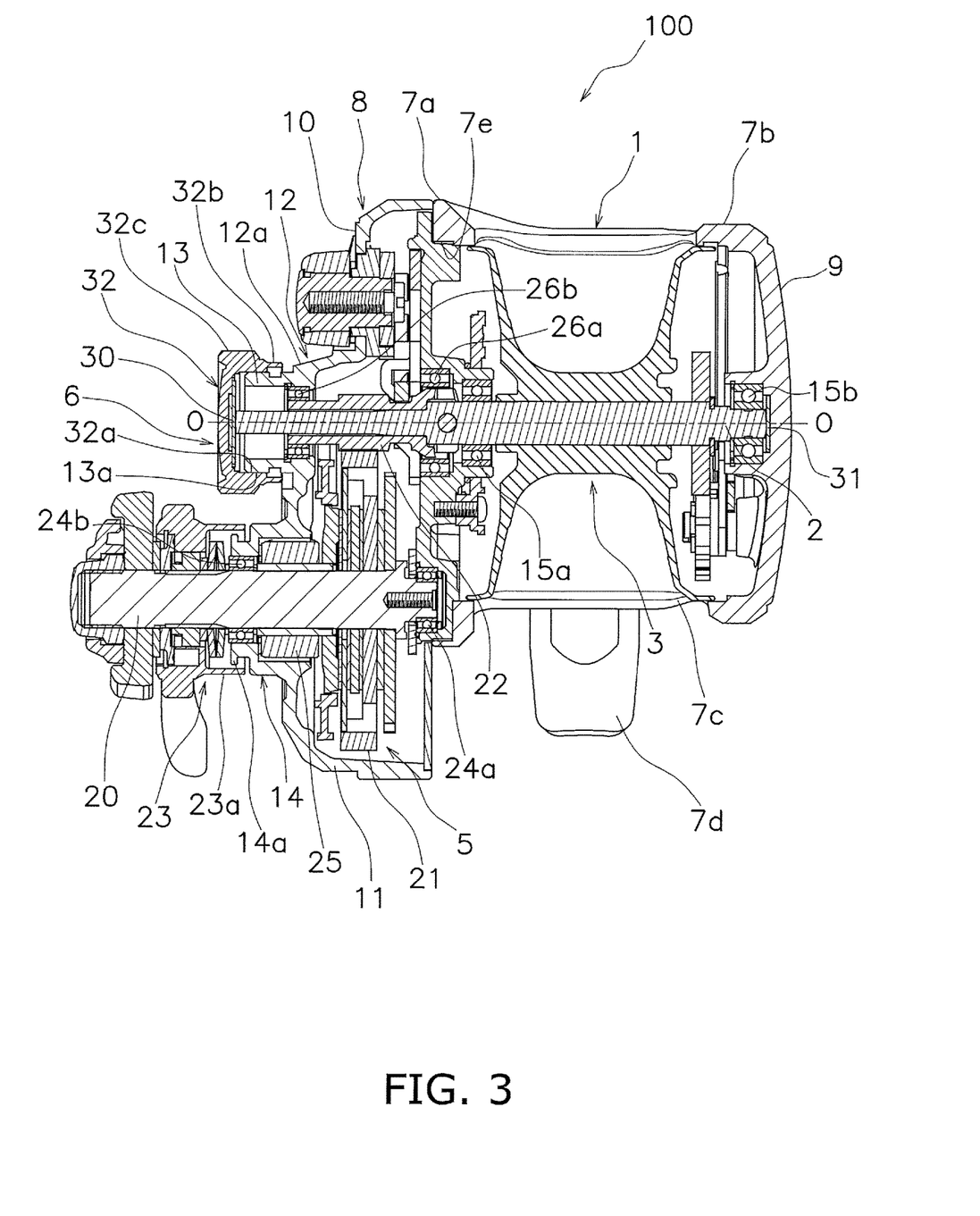
FIG. 3 is a cross-sectional view of FIG. 1 taken along line III-III.

A dual-bearing reel 100, employing a preferred embodiment of the present disclosure, is a dual-bearing reel capable of forwardly releasing a fishing line, and as shown in FIGS. 1, 2 and 3, includes a reel body 1, a spool shaft 2, a spool 3, a handle 4, a rotation transmission mechanism 5 and a casting control mechanism 6. It should be noted that in the following explanation, the term "front" refers to a direction in which the fishing line is released in fishing, whereas the term "rear" refers to the opposite direction to "front". For example, in FIG. 1, the right side is "front", whereas the left side is "rear". Additionally, the term "axial direction" means the extending direction of the spool shaft 2.

The reel body 1 includes a first side plate 7a, a second side plate 7b disposed at an interval from the first side plate 7a in the axial direction, a plurality of coupling parts 7c coupling the first side plate 7a and the second side plate 7b to each other, and a rod attachment part 7d to which a fishing rod is attached.

The first side plate 7a is an approximately disc-shaped member including an opening 7e through which the spool 3 is taken out. The first side plate 7a is covered with a first side cover 8 (an exemplary cover member) from outside.

The first side cover 8 includes a cover part 10, a bulging part 11 and a step part 12. Additionally, the first side cover 8 further includes a first boss part 13 and a second boss part 14 (see FIG. 3). The cover part 10 is disposed outside the first side plate 7a in the axial direction, and covers part of the first side plate 7a.

Figure 4:
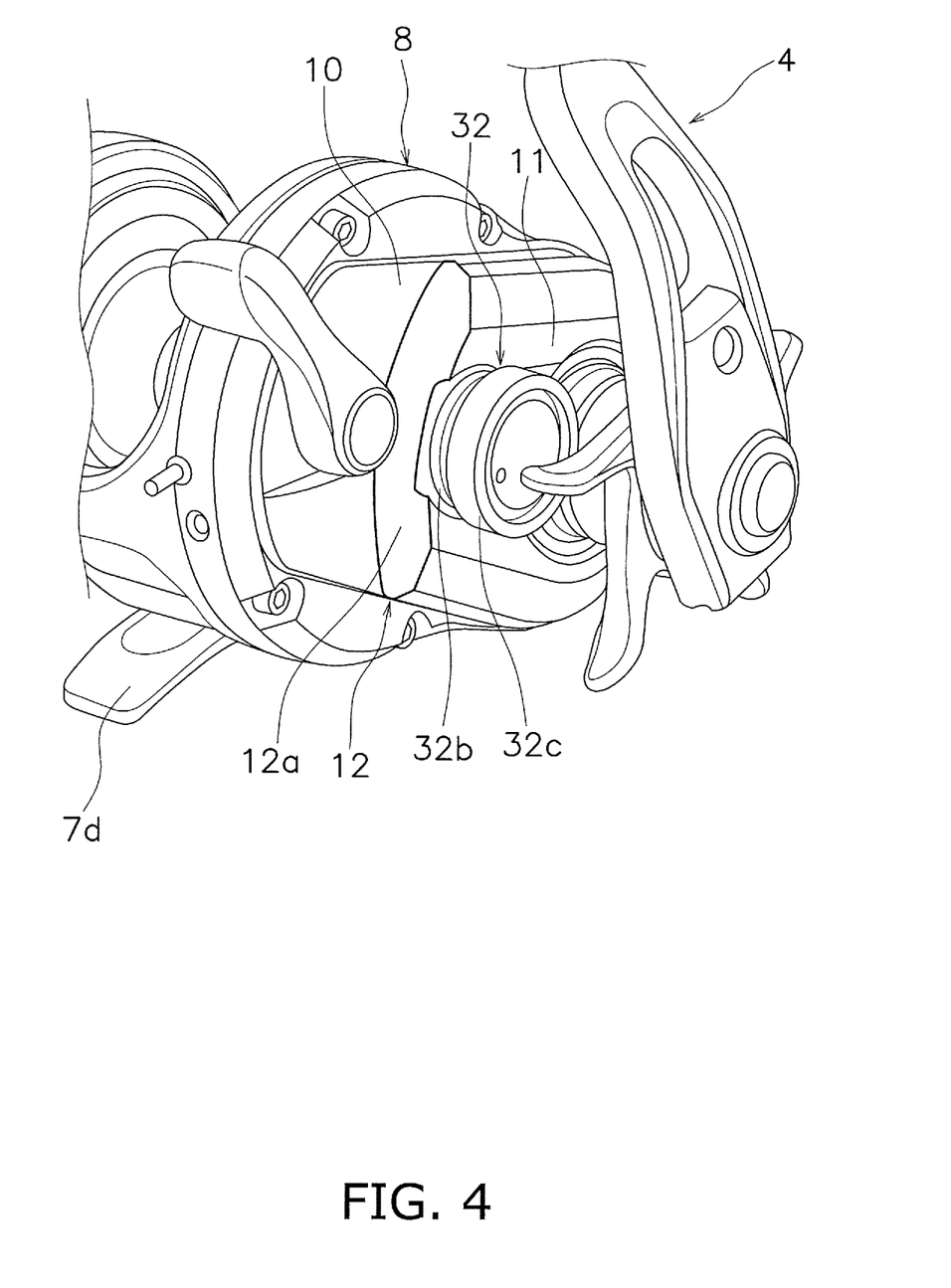
FIG. 4 is a perspective view of the periphery of a first side cover.

The bulging part 11 is shaped to bulge outward from the cover part 10 in the axial direction. Additionally, as shown in FIGS. 1 and 4, the bulging part 11 is also shaped to bulge forward from the cover part 10.

The step part 12 extends outward from the cover part 10 in the axial direction, and connects the cover part 10 and the bulging part 11 to each other. The step part 12 includes a slant part 12a in a region thereof located adjacently to the outer edge of the first boss part 13. The slant part 12a will be described below in detail.

The first boss part 13 is provided in a position located adjacently to the step part 12 so as to protrude outward from the bulging part 11 in the axial direction. The first boss part 13 includes a male threaded part 13a on the outer peripheral surface thereof.

The second boss part 14 is provided in a position located forward of the first boss part 13 so as to protrude outward from the bulging part 11 in the axial direction. The second boss part 14 includes a protrusion 14a on the outer peripheral surface thereof. The protrusion 14a has an annular shape and extends radially outward therefrom.

The second side plate 7b of the reel body 1 is covered with a second side cover 9 and is also integrated therewith. It should be noted that the second side plate 7b and the second side cover 9 can be provided separately from each other.

The spool shaft 2 is rotatably supported by the reel body 1 through bearings 15a and 15b disposed in the reel body 1. The spool shaft 2 extends further outward from the first side plate 7a in the axial direction, and is inserted through the first boss part 13 of the first side cover 8.

The spool 3 is fixed to the spool shaft 2 penetrating the middle thereof, and is rotated together with the spool shaft 2 while being disposed between the first side plate 7a and the second side plate 7b.

The handle 4 is provided on the first side plate 7a side of the reel body 1. In conjunction with the rotational operation for the handle 4, the spool 3 is rotated together with the spool shaft 2 through the rotation transmission mechanism 5.

As shown in FIG. 3, the rotation transmission mechanism 5 includes a drive shaft 20, a drive gear 21, a pinion gear 22 having a tubular shape, and a drag mechanism 23. The drive shaft 20 is non-rotatably coupled to the handle 4, while penetrating the second boss part 14 of the first side cover 8 in the axial direction. The drive shaft 20 is rotatably supported by the reel body 1 through a bearing 24a disposed in the reel body 1 and a bearing 24b disposed in the second boss part 14 of the first side cover 8. It should be noted that the drive shaft 20 is prevented from rotating in a fishing line releasing direction by a one-way clutch 25 disposed in the second boss part 14 of the first side cover 8.

The drive gear 21 is attached to the drive shaft 20. The pinion gear 22 is supported at both ends thereof by a bearing 26a disposed in the reel body 1 and a bearing 26b disposed in the first side cover 8. The pinion gear 22 is attached about the spool shaft 2, and is meshed with the drive gear 21. Rotation of the drive shaft 20 is transmitted to the pinion gear 22 through the drag mechanism 23 and the drive gear 21. Then, the pinion gear 22 is rotated, whereby the spool 3 is rotated together with the spool shaft 2.

The drag mechanism 23 is a mechanism for braking rotation of the spool 3 in the fishing line releasing direction. The configuration of the drag mechanism 23 is similar to that of a well-known drag mechanism. Therefore, detailed explanation thereof will not be hereinafter provided. It should be noted that in the present preferred embodiment, a moving member 23a, which has a tubular shape and composes part of the drag mechanism 23, is disposed to cover part of the outer peripheral part of the second boss part 14 of the first side cover 8. In more detail, the moving member 23a is disposed to cover the annular protrusion 14a of the second boss part 14 from radially outside. Accordingly, water is restricted from intruding into the interior of the first side cover 8 and so forth through a gap between the moving member 23a and the second boss part 14 of the first side cover 8.

The casting control mechanism 6 is a mechanism for regulating the braking force that acts on the spool 3 by pressing the spool shaft 2. As shown in FIG. 3, the casting control mechanism 6 includes a first friction plate 30, a second friction plate 31, and an operating member 32 having a closed-end tubular shape.

The first friction plate 30 is disposed on a bottom part of the operating member 32. The second friction plate 31 is disposed in the second side cover 9. The first friction plate 30 and the second friction plate 31 are disposed to interpose therebetween both ends of the spool shaft 2, and press the spool shaft 2 in the axial direction.

The operating member 32 is attached to the first boss part 13 of the first side cover 8 so as to be turnable. The operating member 32 includes a female threaded part 32a, a small diameter part 32b having an annular shape, and a large diameter part 32c that has an annular shape and is located outside the small diameter part 32b in the axial direction. The female threaded part 32a is provided on the inner peripheral surface of the operating member 32. The female threaded part 32a is screwed onto the male threaded part 13a of the first boss part 13 of the first side cover 8, whereby the operating member 32 is attached to the first boss part 13 so as to be movable in the axial direction.

The small diameter part 32b is provided in a position located adjacently to the step part 12 of the first side cover 8. The small diameter part 32b is provided for preventing the bulging part 11 of the first side cover 8 and the large diameter part 32c from being located overly adjacent to each other in the axial direction. Thus, small diameter part 32b is an example of a means for preventing the bulging part 11 of the first side cover 8 and the large diameter part 32c from being located overly adjacent to each other in the axial direction.

Figure 5:
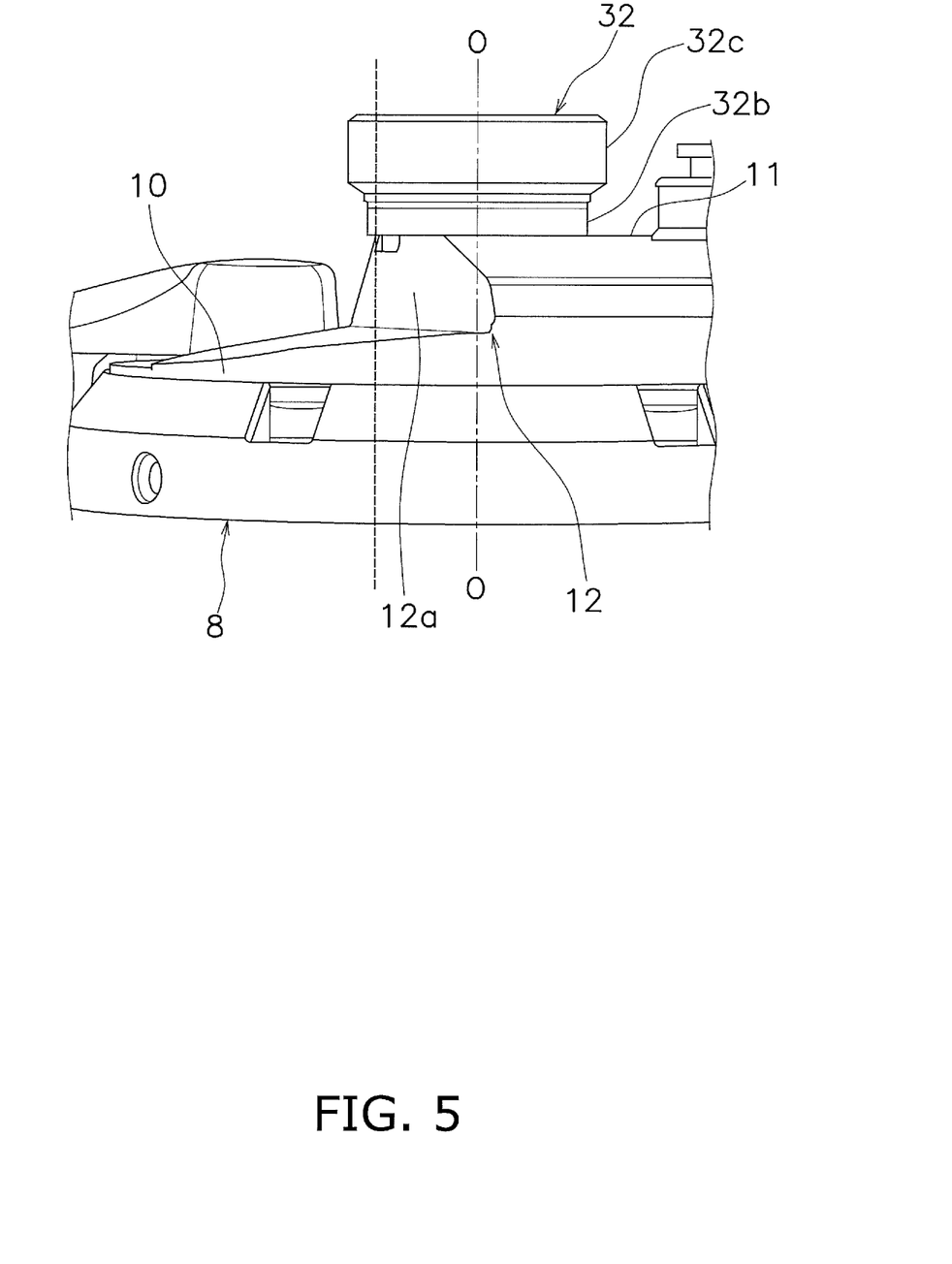
FIG. 5 is a bottom view of the periphery of an operating member.

The large diameter part 32c is a part for which a turning operation is performed while being pinched by two fingers of an angler or while the thumb of the angler is pushed in contact with the outer peripheral surface thereof. Anti-slip treatment is executed for the outer peripheral surface of the large diameter part 32c by, for instance, knurling. The large diameter part 32c has a larger outer diameter than the small diameter part 32b, and has a longer axial length than the small diameter part 32b. As shown in FIGS. 1 and 5, as seen in the axial direction, the large diameter part 32c is configured to protrude at part of the outer periphery thereof from the bulging part 11 of the first side cover 8. It should be noted that FIG. 5 is a bottom view of the periphery of the operating member 32.

The braking force acting on the spool 3 is regulated by performing the turning operation for the large diameter part 32c of the operating member 32. Specifically, when the turning operation is performed for the large diameter part 32c of the operating member 32, the operating member 32 is moved in the axial direction. In conjunction with the axial movement of the operating member 32, the first friction plate 30 disposed on the bottom part of the operating member 32 is moved in the axial direction. Accordingly, the pressing force axially acting on the spool shaft 2 varies, whereby the braking force acting on the spool 3 is regulated. Thus, the casting control mechanism 6 is an example of a means for regulating the braking force that acts on the spool 3 by movement of the operating member 32 in the axial direction.

As shown in FIG. 5, the step part 12, connecting the cover part 10 and the bulging part 11 in the first side cover 8, herein includes the slant part 12a. The slant part 12a slants at a region thereof located adjacently to the operating member 32 so as to gradually approach an axis O of the spool shaft 2 in a direction toward the bulging part 11 from the cover part 10. With the slant part 12a being provided, part of the large diameter part 32c can be protruded from the bulging part 11 of the first side cover 8 as seen in the axial direction without increasing the outer diameter of the large diameter part 32c. It is possible to perform without difficulty the turning operation for the operating member 32 and easily regulate the braking force acting on the spool 3 with the configuration that part of the large diameter part 32c protrudes from the bulging part 11 of the first side cover 8.

Additionally as shown in FIGS. 1 and 4, in the present preferred embodiment, as seen in the axial direction, the slant part 12a extends in a shape of a circular arc with a smaller radius of curvature than the large diameter part 32c of the operating member 32. Therefore, the slant part 12a functions as a restriction part that restricts the range of the turning operation for the operating member 32. Further, the slant part 12a is an example of a means for restricting the range of the turning operation for the operating member 32. Detailedly, when the turning operation is gradually performed for the operating member 32 while the thumb of the angler is pushed in contact with the outer peripheral surface of the large diameter part 32c of the operating member 32, a pad of the thumb pushed in contact with the large diameter part 32c makes contact with the surface of the slant part 12a. The operating member 32 is thus an example of a means for performing a turning operation. In other words, the range of the turning operation for the operating member 32 is restricted by performing the turning operation for the operating member 32 while the thumb of the angler is moved along the slant part 12a. Therefore, the angler can sensuously recognize to what extent the operating member 32 has been turned. Additionally, too much tightening or loosening of the operating member 32 can be prevented by restricting the range of the turning operation for the operating member 32. Accordingly, minute regulation can be easily done for the braking force acting on the spool 3.

Other Preferred Embodiments

The preferred embodiment of the present disclosure has been explained above. However, specific configurations in the present disclosure are not limited to those described in the preferred embodiment, and a variety of changes can be made without departing from the gist of the present disclosure.

(a) In the aforementioned preferred embodiment, the slant part 12a is provided on the step part 12 of the first side cover 8, and moreover, the small diameter part 32b and the large diameter part 32c are provided on the operating member 32. However, these parts are not necessarily required to be provided as long as part of the outer periphery of the operating member 32 protrudes from the bulging part 11 of the first side cover 8 as seen in the axial direction. For example, the step part 12 can have a shape flatly extending outward in the axial direction.

(b) In the aforementioned preferred embodiment, the slant part 12a of the step part 12 has a circular-arc shape. However, the shape of the slant part 12a is not limited to this. The shape of the slant part 12a can be suitably adjusted depending on the position of the first boss part 13 protruding from the bulging part 11 of the first side cover 8 and so forth.

(c) In the aforementioned preferred embodiment, the spool 3 is fixed to the outer periphery of the spool shaft 2. However, the present disclosure is similarly applicable to a structure in which the spool is rotated with respect to the spool shaft or a structure in which the spool shaft is divided.

What is claimed is:
1. A dual-bearing reel including a spool for rotating in conjunction with rotation of a spool shaft and a handle, the dual-bearing reel configured to forwardly release a fishing line, the dual-bearing reel comprising:
   a reel body including a first side plate, a second side plate and a coupling part, the second side plate provided at an interval from the first side plate in an axial direction of the spool shaft, the coupling part coupling the first side plate and the second side plate;
   a cover member disposed to cover the reel body from a first side plate side, the cover member including a cover part, a bulging part, a step part and a first boss part, the cover part located outside the first side plate in the axial direction, the bulging part bulging outward from the cover part in the axial direction, the step part extending outward from the cover part in the axial direction, the step part connecting the cover part and the bulging part, the first boss part having a shape protruding outward from the bulging part in the axial direction, the first boss part configured to cause the spool shaft to be inserted therethrough; and a casting control mechanism including an operating member, the operating member attached to the first boss part so as to be movable in the axial direction, the operating member protruding at part of an outer periphery thereof from the bulging part as seen in the axial direction, the casting control mechanism configured to regulate a braking force for acting on the spool by movement of the operating member in the axial direction, a part of an outermost periphery of the operating member disposed radially outside of a boundary between the bulging part and the step part.

2. The dual-bearing reel according to claim 1, wherein the step part includes a slant part, the slant part slanting at a region thereof located adjacently to the operating member so as to gradually approach an axis of the spool shaft in a direction toward the bulging part from the cover part.

3. The dual-bearing reel according to claim 2, wherein the slant part extends in a circular-arc shape as seen in the axial direction.

4. The dual-bearing reel according to claim 3, wherein the operating member is a turning member having a closed-end tubular shape, the operating member attached at an inner peripheral part thereof to an outer peripheral part of the first boss part so as to be turnable, the operating member including a small diameter part and a large diameter part, the large diameter part having a larger outer diameter than the small diameter part, the large diameter part provided outside the small diameter part in the axial direction, the large diameter part protruding at part of an outer periphery thereof from the bulging part as seen in the axial direction.

5. The dual-bearing reel according to claim 4, wherein the circular-arc shape has a smaller radius of curvature than the large diameter part of the operating member.

6. The dual-bearing reel according to claim 2, wherein the operating member is a turning member having a closed-end tubular shape, the operating member attached at an inner peripheral part thereof to an outer peripheral part of the first boss part so as to be turnable, the operating member including a small diameter part and a large diameter part, the large diameter part having a larger outer diameter than the small diameter part, the large diameter part provided outside the small diameter part in the axial direction, the large diameter part protruding at part of an outer periphery thereof from the bulging part as seen in the axial direction.

7. The dual-bearing reel according to claim 1, wherein the operating member is a turning member having a closed-end tubular shape, the operating member attached at an inner peripheral part thereof to an outer peripheral part of the first boss part so as to be turnable, the operating member including a small diameter part and a large diameter part, the large diameter part having a larger outer diameter than the small diameter part, the large diameter part provided outside the small diameter part in the axial direction, the large diameter part protruding at part of an outer periphery thereof from the bulging part as seen in the axial direction.

8. The dual-bearing reel according to claim 1, wherein the operating member is a turning member having a closed-end tubular shape, the operating member attached at an inner peripheral part thereof to an outer peripheral part of the first boss part so as to be turnable, the operating member including a small diameter part and a large diameter part, the large diameter part having a larger outer diameter than the small diameter part, the large diameter part provided outside the small diameter part in the axial direction, the large diameter part protruding at part of an outer periphery thereof from the bulging part as seen in the axial direction.

9. The dual-bearing reel according to claim 1, wherein
the cover member further includes a second boss part, the second boss part provided in a position located forward of the first boss part so as to protrude outward from the bulging part in the axial direction, and
the dual-bearing reel further comprises a drive shaft configured to penetrate the second boss part in the axial direction.

\* \* \* \* \*